US011062533B2

(12) United States Patent
McConkey et al.

(10) Patent No.: US 11,062,533 B2
(45) Date of Patent: Jul. 13, 2021

(54) UNIVERSAL HIGH REDUNDANCY SENSOR INTERFACE FOR LOW COST SENSING

(71) Applicant: Siemens Energy, Inc., Orlando, FL (US)

(72) Inventors: Joshua S. McConkey, Orlando, FL (US); Tao Cui, Princeton Junction, NJ (US)

(73) Assignee: SIEMENS ENERGY, INC., Orlando, FL (US)

( * ) Notice: Subject to any disclaimer, the term of this patent is extended or adjusted under 35 U.S.C. 154(b) by 221 days.

(21) Appl. No.: 16/132,835

(22) Filed: Sep. 17, 2018

(65) Prior Publication Data

US 2019/0019358 A1 Jan. 17, 2019

Related U.S. Application Data

(60) Continuation-in-part of application No. 16/047,760, filed on Jul. 27, 2018, which is a division of application No. 15/229,244, filed on Aug. 5, 2016, now Pat. No. 10,055,905.

(51) Int. Cl.
*G07C 5/08* (2006.01)
*F01D 21/14* (2006.01)
*G01M 15/14* (2006.01)
*F01D 21/00* (2006.01)
*G07C 3/00* (2006.01)

(52) U.S. Cl.
CPC ......... *G07C 5/0808* (2013.01); *F01D 21/003* (2013.01); *F01D 21/14* (2013.01); *G01M 15/14* (2013.01); *F05D 2220/32* (2013.01); *F05D 2260/80* (2013.01); *F05D 2270/80* (2013.01); *F05D 2270/803* (2013.01); *G07C 3/00* (2013.01)

(58) Field of Classification Search
CPC ......... G07C 5/0808; G07C 3/00; F01D 21/14; F01D 21/003; G01M 15/14; F05D 2270/803; F05D 2220/32; F05D 2270/80; F05D 2260/80
See application file for complete search history.

(56) References Cited

U.S. PATENT DOCUMENTS

| 6,933,843 B1 * | 8/2005 | Hom | G07C 3/00 340/545.1 |
| 10,041,808 B2 * | 8/2018 | Guillet | B64D 43/02 |
| 2015/0152791 A1 * | 6/2015 | White | F02C 9/26 60/773 |

* cited by examiner

*Primary Examiner* — Michael V Kerrigan

(57) ABSTRACT

A sensing system is provided. The sensing system includes a processor, a sensor node, a plurality of sensors, a power source and a controller. The sensor node is operably connected to the processor on an industrial side and to the sensors on a sensor side. The sensors each measure a parameter of the sensing system and transmit the parameter to the processor via the sensor node. The power source delivers power to the processor. The controller is in operable communication with the processor. The sensor node, disposed in close proximity to the sensors, converts a data protocol for each of the sensors to a different industrial protocol and transmits the converted data through a communication port via the industrial data protocol to the processor. The processor then collects the measurements of each parameter of the plurality of sensors, analyses the measurements and transmits the analyzed data to the controller.

10 Claims, 2 Drawing Sheets

UNIVERSAL HIGH REDUNDANCY SENSOR INTERFACE FOR LOW COST SENSING

This application is a continuation in-part of U.S. application Ser. No. 16/047,760 filed Aug. 7, 2018, which is a divisional of U.S. application Ser. No. 15/229,244 filed Aug. 5, 2016 (now U.S. patent Ser. No. 10/055,905), each of which is hereby incorporated by reference herein.

BACKGROUND

1. Field

The present disclosure relates generally to sensor measurement within an industrial system and more particularly, to a sensing system having a sensor interface that converts a data protocol of low-cost sensors to a different industrial communication protocol.

2. Description of the Related Art

The sensing technology has been advancing rapidly recently due to the rapid development of MEMS (micro-electro mechanical system), embedded hardware, electronics, and communication technologies. This 'Internet of Things' (IoT) technology, as a synergy of low cost sensing, communication, and cloud computing has gained more and more interest in various industries. However, currently most IoT technologies are primarily focusing on consumer products. For example, low cost IoT sensors are not generally accepted for heavy industry applications due to various reasons. In order for heavy industry applications to take advantage of this technology, there are multiple challenges that need to be addressed. These challenges include having reliable data transmission in harsh environments, having a unified/interoperable interface, and having highly reliable and accurate sensors. Most low-cost sensors using consumer-oriented communication protocols cannot withstand the harsh environment of a power plant, for example. Thus, a communication method is needed that can withstand harsh environments. Additionally, most low-cost sensors talk different protocols for IoT applications than what is currently used in industrial applications. In order to integrate and utilize different low-cost sensors together for industrial applications, a unifying interface is needed. Furthermore, most IoT sensors are not designed with high reliability or accuracy for industrial applications. Thus, to utilize low cost sensors at low cost for reliable and accurate measurement, a redundant design is needed.

For these reasons, the current inventors propose a universal high redundancy sensor interface that can utilize low cost sensors in an industrial application converting the protocols typically used by the low-cost sensor to protocols utilized in heavy industrial applications such as in a gas turbine and/or in a power plant.

SUMMARY

Briefly described, aspects of the present disclosure relate to a sensing system and a hyper-redundant monitoring system.

A first aspect provides a sensing system. The sensing system includes a processor, a sensor node, a plurality of sensors, a power source and a controller. The sensor node is operably connected to the processor on an industrial side and to the plurality of sensors on a sensor side. The plurality of sensors each measure a parameter of the sensing system and are configured to transmit the parameter to the processor via the sensor node. The power source delivers power to the processor. The controller is in operable communication with the processor. The sensor node, disposed in close proximity to the plurality of sensors, converts a data protocol for each of the plurality of sensors to a different industrial protocol and transmits the converted data through a communication port via the industrial data protocol to the processor. The processor then collects the measurements of each parameter of the plurality of sensors, analyses the measurements to determine analyzed data, and transmits the analyzed data to the controller.

A second aspect provides a hyper-redundant monitoring system. The hyper-redundant monitoring system includes the sensing system where the plurality of sensors are redundantly measuring a single parameter and configurated to transmit measurements of the single parameter to the sensor node. The sensor node converts a data protocol for each of the redundant sensors to a different industrial data protocol and transmits the converted data via the industrial data protocol to the processor. After collecting the measurements and analysing the measurements, the processor transmits the analyzed data to the controller. The controller uses the analyzed data to change operating parameter on a gas turbine engine.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A hyper-redundant sensor configuration for monitoring parameters within a gas turbine engine has been described in U.S. Pat. No. 10,055,905, which is incorporated herein by reference. Briefly, the hyper-redundant monitoring system presented in U.S. Ser. No. 10/055,905 includes a processor, a sensor node operably connected to the processor, a power source that delivers power to the processor, and a controller in operable communication with the processor. The sensor node communicates with a plurality of sensors disposed in close proximity to one another such that a single parameter is measured by each of the sensors and each sensor is configured to transmit measurements of the single parameter to the processor. The single parameter is output by each of the sensors and transmitted to the processor via the sensor node. The processor then collects the output parameters by each of the sensors, analyzes the output parameters, and transmits analyzed data to the controller. The innovative design of the sensor node in the form of a universal high redundancy sensor interface is the subject of this disclosure.

It should be understood that a processor that is described or claimed as being configured to carry out a particular described/claimed processor or function may correspond to a microprocessor that is hard wired and/or includes firmware programmed to carry out such a described/claimed process.

Figure 1:
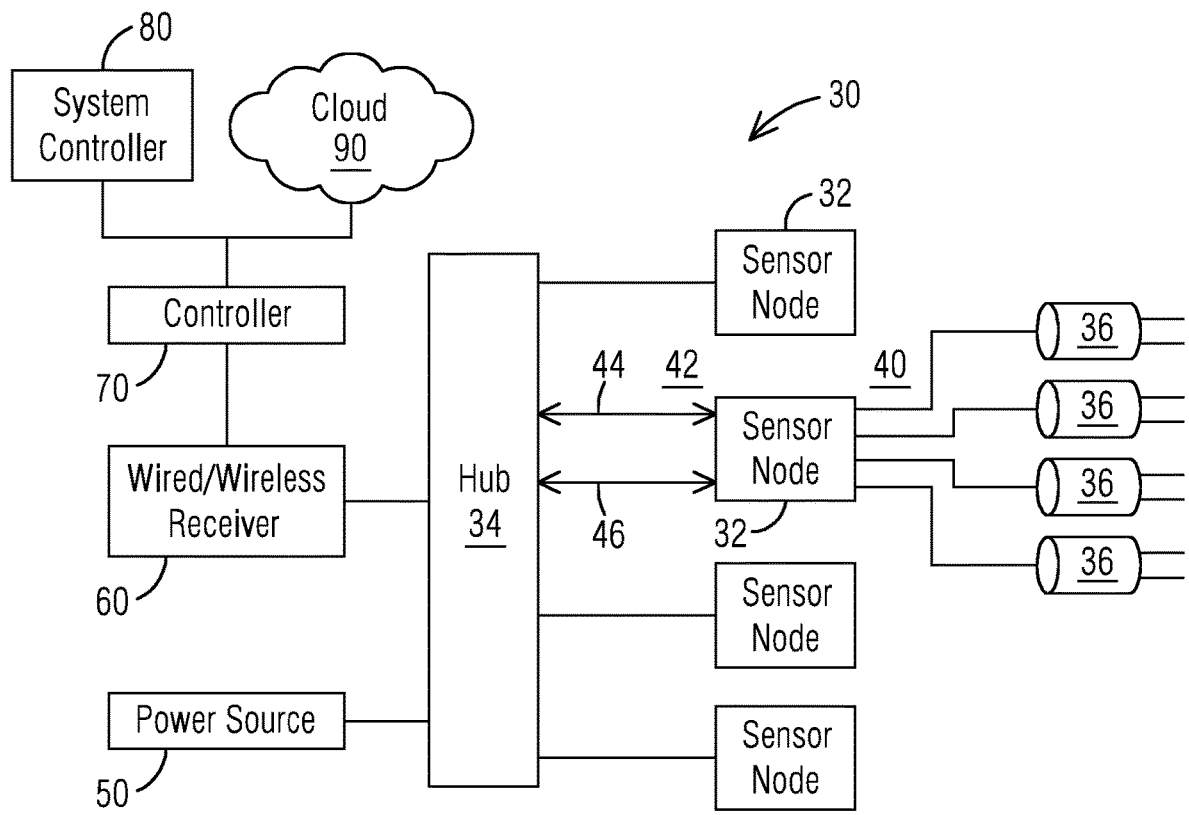
FIG. 1 is a schematic view of a sensing system.
Figure 2:
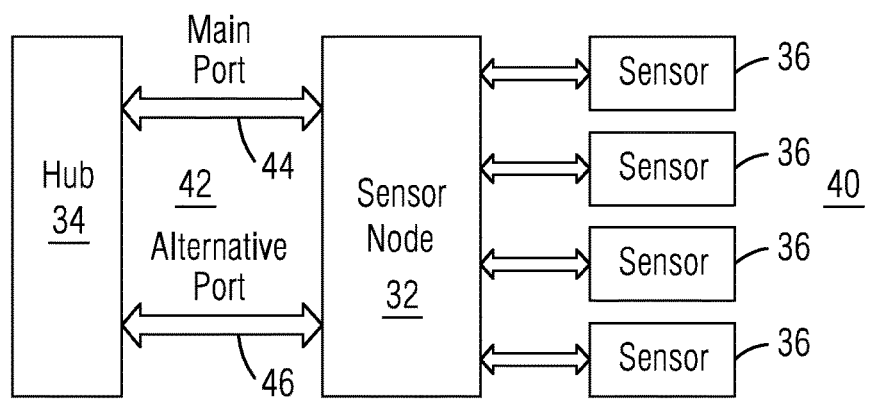
FIG. 2 is a schematic view of a universal high redundancy sensor interface.
Figure 3:
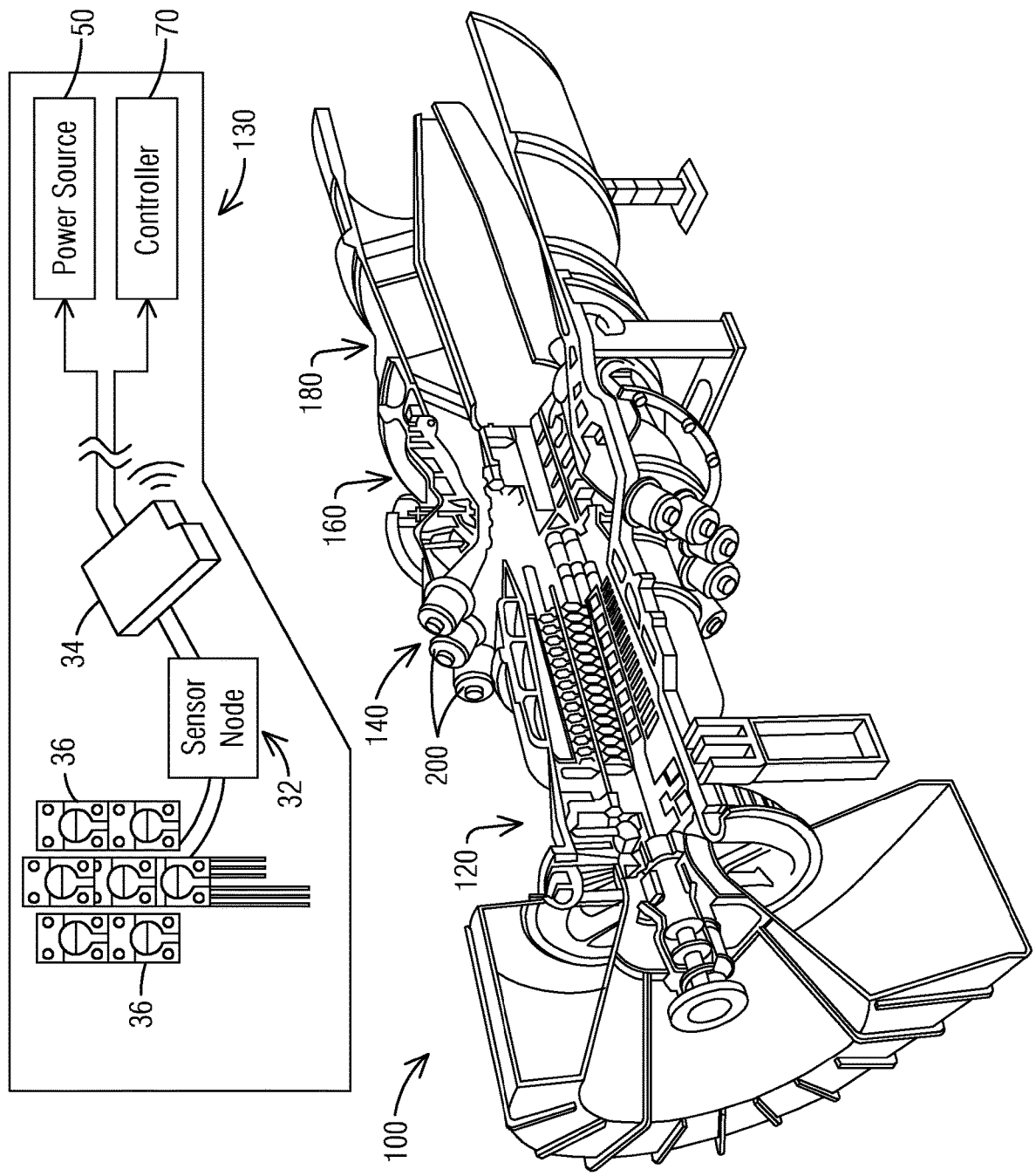
FIG. 3 is a longitudinal view of a gas turbine including a hyper redundant monitoring system.

Referring now to the FIGS. 1-3, where the showings are for purposes of illustrating embodiments of the subject matter herein only and not for limiting the same, FIG. 1 illustrates a schematic of a sensing system 30. The sensing system 30 may include a controller 70 which may be in operable communication with an industrial system controller 80 such as a gas turbine engine controller. Those skilled in the art would understand that the disclosed hyper-redundant monitoring system may be employed in many other industrial systems as well as the embodiment including a gas turbine engine as discussed, for exemplary purposes, below.

Referring to FIG. 1, a sensing system 30 is shown including at least one sensor node 32. The sensor node 32 communicates with a plurality of sensors 36 on a sensor side 40 and is operably connected to a hub comprising a processor 34 on an industrial side 42. The processor 34 may be a small, low cost computer. The sensing system 30 may also include a controller 70 connected with the processor 34. The controller 70 may be in operable communication with an industrial system controller 80 in order to use the measured parameter data for controlling a gas turbine or a power plant, for example. Alternately to communicating with an industrial system controller 80, in a further embodiment, the measured data may be communicated to the Cloud 90 for further processing or for storage. On the sensor side 40, the parameter may be output by each sensor 36 and transmitted to the processor 34, via the sensor node 32. The sensor data may then be analyzed and compiled by the processor 34 and transmitted wirelessly/wired to a receiver 60 to which the controller 70 has access. A power source 50 delivers power to the processor 34.

Referring now to FIG. 2, a universal high redundancy sensor interface, referred herein as a sensor node 32, is illustrated. The sensor node 32 is operably connected to the processor 34 on the industrial side 42 and to the plurality of sensors 36 on the sensor side 40. On the sensor side 40, the sensor node 32 may include dedicated ports for each sensor 36. The dedicated ports may include a digital bus that carries both power to the sensors 36 and data to and from the sensors 36. Through these ports, the sensor node 32 supports a multitude of commonly used low-cost digital sensor protocols including but not limited to I²C (I squared C) and SPI (Serial Peripheral Interface). Note that the digital sensor protocols, I²C and SPI, are primarily designed for local on-board communication with short distance. Thus, in an embodiment, the sensor node 32 is disposed in close proximity to the plurality of sensors 36. For example, in an embodiment, the short distance may be 2 meters or less.

In an embodiment, on the industrial side 42, the sensor node 32 includes dedicated ports to connect to an industrial system. It should be appreciated that in example embodiments the sensor side and the industrial side may be on different sides or the same side of the sensor node. A communication data protocol that is designed for longer distance and can withstand interference in a harsher environment such as that of a gas turbine engine may be utilized over the dedicated ports to the industrial system. In an embodiment, the distance between sensor node 32 and the processor 34 may be up to 200 meters using basic 1-Wire bus interface. Through these dedicated ports, the sensor node 32 may support such protocols such as 1-Wire and RS-485 that may be used for longer distance communication within a harsher environment. In an embodiment, the industrial side 42 of the sensor node 32 includes a main communication port 44 and a redundant communication port 46 configured to be redundant with the main port 44 such that sensor node 32 may switch to the redundant communication port 46 when the main communication port 44 is faulty.

In an embodiment, the sensors 36 are redundant such that they measure the same parameter, for example, the same pressure. In order to accomplish this, the sensors 36 are disposed in close proximity to one another and the sensor leads would be in contact with the parameter being measured within the system 30, such as a temperature within a chamber of a gas turbine engine.

In the shown embodiment of FIG. 1, the sensor node 32 connects to four sensors 36. Typically, each sensor node 32 in a hyper-redundant monitoring configuration comprises a number of sensors 36 in a range from 3 to 8 sensors. Increasing the number of sensors 36 per node 32 has been shown to reduce sensor node failures exponentially. The sensors 36 may be of a MEMS structure or other monolithically produced sensor. In an embodiment, the sensors may be any low-cost sensor with a digital output such as but not limited to thermocouples measuring temperature, pressure sensors measuring pressure, humidity sensors measuring the humidity at the location, level sensors measuring gas or fluid levels, and actuator sensors that measure valve or actuator positions, along with many other types of sensors. One skilled in the art would understand that other parameter measurements may be possible.

In an embodiment, a set of programmed instructions within the sensor node 32 may be utilized for communication with the plurality of sensors 36 and/or the hub processor 34 on the industrial side. For example, the sensor node 32 may send commands such as Start Measurement and/or Read Measurement Value. Similarly, the sensor node 32 may include a set of programmed instructions for communication with the processor. On the industrial side 42, for example, the sensor node 32 may send commands to Read/Write the data measurements.

Alternately to a redundant sensor configuration, the sensor node 32 may also connect to different types of sensors measuring different types of parameters. For example, the sensor node 32 can support sensors redundantly measuring a temperature while another sensor(s) measure pressure. This functionality is enabled as the sensor node 32 supports most commonly used sensor protocols on the sensor side 40. In this way, the sensor node 32 serves as a switching or routing device which enables the connections and integrations of multiple low-cost sensors into the system at low cost.

Power may be delivered to the sensing system 30 by a power source from various means. In an embodiment, the processor 34 of the hub receives power from an electrical power supply line. Alternately, the processor 34 may receive power via solar panels with a rechargeable battery module. For example, as shown in the embodiment of FIG. 1, power may be delivered to each sensor node 32 via a wire from the processor 34. In an alternate embodiment, each sensor 36 may derive power by energy harvesting. As an example of energy harvesting, solar energy may be captured and stored for use by the processor 34 and delivered to each sensor 36. Further, power may be delivered form the processor 34 to the sensor node 32 by a data cable, which is usually referred to as parasite power. Furthermore, the power to the processor 34 may also be delivered via a data cable as well as a Cat5/6 data cable via a methodology called Power Over Ethernet. Thus, in this embodiment the data and power are carried by the same cable reducing the number of wires needed.

In an embodiment, the processor is a centralized data multiplexer that is in operable communication with a sensor node 32 or a plurality of nodes 32. The processor 34 may perform many functions including collecting the parameter outputs from the sensor nodes 32, comparing the parameter outputs, voting, analyzing the data, and reporting the data to the controller 70. The hyper-redundant functionality of the sensors 36 enables the processor 34 the ability to compare the parameter data and disregard the low and high readings for example. Assuming that most of the redundant sensors behave similarly on the same measurement, when a sensor in this group of redundant sensors reports a value for the parameter that is significantly different from the majority, that sensor 36 may be marked as an outlier and its output parameter will be excluded from further use. Additionally, the sensor 36 may be marked as needing further examination in the future. Further, algorithms running on the sensor node 32 may analyze the output parameter to determine when a sensor 36 may be faulty and predict when an individual sensor 36 may require replacement. In an embodiment, the sensor node 32, or the processor 34, or the controller 70 may average the sensor readings when the sensors 36 are configured redundantly. By averaging the sensor readings, randomness error may be reduced.

Referring to FIG. 3, a gas turbine engine 100 including a hyper-redundant monitoring system 130, as described above, is provided. The engine 100 includes a compressor section 120, a combustor section 140, a turbine section 160, and an exhaust section or system 180. The combustor section 140 includes a plurality of combustors 200. A hot working gas is conveyed from the combustor section 140 through to the turbine section 160. A hyper-redundant monitoring system 30 is shown including a sensor node 32 comprising a plurality of sensors 36, the sensor node 32 operably connected to a processor 34. The analyzed data provided to the controller 70 by the processor 34 may be used to control aspects of the gas turbine engine 100 including shutting down the gas turbine when a maintenance condition is needed. For example, the processor 34 may predict when a sensor node 32 will fail such that no individual sensors will be operable. Before that occurs, the processor 34 can predict when a maintenance condition may be needed. With this information, the controller 70 may put the gas turbine engine 100 into an outage condition so that the individual sensors 36 of the sensor node 32 may be replaced.

It may be appreciated that the disclosed sensing system having the universal high redundancy sensor interface provides an interoperable interface that converts many low-cost sensor protocols to protocols mostly utilized by heavy industry. On the sensor side, most commonly used sensor protocols such as I²C and SPI are supported by the sensor node. These protocols are designed mostly for on-board short distance communication and thus are not suitable for long distance off-board communication. However, the proposed sensor node supports these protocols by including the proper communication stacks and hardware setup. For example, the wires that connect the sensors to the sensor node will be shorter and will be properly shielded. These features help to enable the sensor node to read sensor data from most types of low-cost sensors. Furthermore, on the industry side, the sensor node sends the sensor data to a related industrial controller through a reliable communication protocol suitable for relatively longer distance off-board communication. The applicable protocols include but not limited to 1-Wire and/or RS485. The wires on this side may be longer and able to withstand stronger EMI (electromagnetic interference) due to the inherent physical characteristics.

The system may also include redundancy. The sensor node integrates redundant sensors into the system for a single measurement. The sensor node may employ logic to process the redundant sensor data close to the sensors. In this way, the overall reliability of the targeted measurement can be significantly improved using low cost sensors.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:
1. A sensing system, comprising:
a processor;
a sensor node operably connected to the processor and to a plurality of sensors;
the plurality of sensors each measuring a parameter of the sensing system and configured to transmit the measured parameter to the processor via the sensor node; and
wherein the sensor node converts a data protocol for each of the plurality sensors to a different industrial data protocol and transmits converted data through a communication port via the industrial data protocol to the processor,
wherein the sensor node is disposed in closer proximity to the plurality of sensors than the sensor node is to the processor,
wherein the processor collects the measured parameter of each of the plurality of sensors, analyzes the measured parameters to determine analyzed data, and transmits the analyzed data to a controller,
wherein, on an industrial side, the sensor node includes a main communication port and a redundant communication port, and
wherein the redundant communication port is configured to be redundant with the main communication port such that the sensor node switches to the redundant communication port when the main communication port is faulty.

2. The sensing system as claimed in claim 1, wherein a distance between each sensor of the plurality of redundant sensors and the sensor node is 2 meters or less.

3. The sensing system as claimed in claim 1, wherein a distance between the sensor node and the processor lies in a range up to 200 meters.

4. A hyper-redundant monitoring system, comprising:
a processor;
a sensor node operably connected to the processor on an industrial side and to a plurality of redundant sensors on a sensor side, wherein the plurality of redundant sensors are disposed in close proximity to one another such that a single parameter is measured by each of the plurality of redundant sensors and each sensor is configured to transmit measurements of the single parameter to the sensor node; and
a controller in operable communication with the processor,
wherein the sensor node converts a data protocol for each of the redundant sensors to a different industrial data protocol and transmits converted data via the industrial data protocol to the processor, wherein the processor collects the measurements of the single parameter of each of the plurality of redundant sensors, analyzes the measurements of the single parameter to determine analyzed data, and transmits the analyzed data to the controller, and wherein the sensor node is disposed in closer proximity to the plurality of redundant sensors than the sensor node is to the processor, and wherein the controller uses the analyzed data to change an operating parameter on a gas turbine engine, and wherein the industrial side of the sensor node includes a main communication port and a redundant communication port configured to be redundant with the main communication port such that the sensor node may switch to the redundant communication port when the main communication port is faulty.

5. The hyper-redundant monitoring system as claimed in claim 4, wherein the single parameter is at least one of temperature, pressure, humidity, fluid level, actuator position, and vibration.

6. The hyper-redundant monitoring system as claimed in claim 4, wherein the controller uses the analyzed data to determine when to shut down the gas turbine engine.

7. The hyper-redundant monitoring system as claimed in claim 4, wherein the plurality of redundant sensors number in a range of three to eight sensors.

8. The hyper-redundant monitoring system as claimed in claim 4, wherein a final measurement output includes an average of the single parameter of each of the plurality of redundant sensors.

9. The hyper-redundant monitoring system as claimed in claim 4, wherein the data protocol utilized by each of the plurality of sensors includes $I^2C$ or SPI.

10. The hyper-redundant monitoring system as claimed in claim 4, wherein the industrial data protocol utilized for communication between the sensor node and the processor includes 1-Wire or RS-485.

* * * * *